(12) United States Patent
Bhat et al.

(10) Patent No.: US 7,725,881 B2
(45) Date of Patent: May 25, 2010

(54) AUTOMATICALLY EXTRACTING COUPLING METRICS FROM COMPILED CODE

(75) Inventors: Thirumalesh K. Bhat, Sammamish, WA (US); Nachiappan Nagappan, Redmond, WA (US); Arild E. Skjolsvod, Kenmore, WA (US)

(73) Assignee: Microsoft Corporation, Redmond, WA (US)

( * ) Notice: Subject to any disclaimer, the term of this patent is extended or adjusted under 35 U.S.C. 154(b) by 1020 days.

(21) Appl. No.: 11/449,905

(22) Filed: Jun. 9, 2006

(65) Prior Publication Data

US 2007/0288910 A1     Dec. 13, 2007

(51) Int. Cl.
*G06F 9/44* (2006.01)
(52) U.S. Cl. .................. 717/124; 717/125; 717/126; 717/127; 717/128
(58) Field of Classification Search ......... 717/124–128, 717/130–133
See application file for complete search history.

(56) References Cited

U.S. PATENT DOCUMENTS

| | | | |
|---|---|---|---|
| 6,460,178 B1 | 10/2002 | Chan et al. | |
| 6,481,008 B1 | 11/2002 | Chaiken et al. | |
| 6,609,248 B1 | 8/2003 | Srivastava et al. | |
| 6,662,356 B1 | 12/2003 | Edwards et al. | |
| 6,748,555 B1 | 6/2004 | Teegan et al. | |
| 6,802,054 B2* | 10/2004 | Faraj | 717/128 |
| 6,802,056 B1 | 10/2004 | Chaiken et al. | |
| 7,131,064 B2* | 10/2006 | Dencker et al. | 717/118 |
| 7,266,810 B2* | 9/2007 | Karkare et al. | 717/130 |
| 7,275,241 B2* | 9/2007 | Choi et al. | 717/143 |
| 2001/0025267 A1 | 9/2001 | Janiszewski | |
| 2003/0204838 A1 | 10/2003 | Caspole et al. | |
| 2004/0040014 A1 | 2/2004 | Ball | |
| 2004/0230964 A1 | 11/2004 | Waugh et al. | |
| 2005/0010891 A1 | 1/2005 | Chaiken et al. | |
| 2006/0005161 A1 | 1/2006 | Atkin et al. | |
| 2006/0005166 A1 | 1/2006 | Atkin et al. | |

FOREIGN PATENT DOCUMENTS

WO    WO-9904337    1/1999

OTHER PUBLICATIONS

Bhansali, et al. "Framework for Instruction-level Tracing and Analysis of Program Executions", 2006, ACM, p. 154-163.*

(Continued)

*Primary Examiner*—Wei Y Zhen
*Assistant Examiner*—Qamrun Nahar
(74) *Attorney, Agent, or Firm*—Capitol City TechLaw; Richard C. Irving

(57) ABSTRACT

Code coupling metrics are extracted from compiled code rather than from source code or software specifications. Examples of compiled code include binary machine code and machine-independent intermediate code that is convertible into binary machine code by a just-in-time compiler. The compiled code may be compiled from source code written in an object-oriented programming language, or from source code written in a procedural programming language, or from any combination thereof. A coupling metrics system includes a reader to access compiled code and its symbol table information, and a coupling metrics extraction component to calculate coupling metrics from the compiled code and its symbol table information. The coupling metrics system may be part of an integrated development environment (IDE) system.

18 Claims, 7 Drawing Sheets

OTHER PUBLICATIONS

Rajaraman, Chandrashekar, et al., "Reliability and maintainability related software coupling metrics in C++ programs", http://ieeexplore.ieee.org /search/srchabstract.jsp?arnumber=285898&isnumber=7090&punumber=434&k2dockey=285898@ieeecnfs&query=%28+%28+%7E%7Esoftware+/search/srchabstract.jsp?arnumber=285898&isnumber=7090&punumber=434 &k2dockey=285898@ieeecnfs&query=%28+%28+%7E%7Esoftware+%29+29%3Cor%3E%7E%7Esoftware+coupling+%7E%7+metric&pos=0, 1992, IEEE, p. 303-311.

97/01287246.pdf?isnumber=28697&arnumber=1287246, Proceedings of the 10th Working Conference on Reverse Engineering (WCRE' 03), 2003, IEEE.

Offutt et al., "A Software Metric System for Module Coupling", The Journal of Systems and Software, Elsevier North Holland Inc., Mar. 1993, vol. 20, No. 3, pp. 295-308, retrieved at: http://cs.gmu.edu/~offutt/rsrch/papers/mj-coupling.pdf.

Dagpinar, Melis et al., "Predicting Maintainability with Object-Oriented Metrics—An Empirical Comparison", Proceedings on the 10th Working Conference on Reverse Engineering (WCRE' 03), Nov. 2003, IEEE, p. 1-10.

Srivastava, Amitabh et al., "Vulcan Binary Transformation in a Distributed Environment", Microsoft Corp., Apr. 20, 2001, retrieved at http://research.microsoft.com/pubs/69850/tr-2001-50.pdf, p. 3-12.

* cited by examiner

AUTOMATICALLY EXTRACTING COUPLING METRICS FROM COMPILED CODE

CROSS REFERENCE TO RELATED APPLICATIONS

U.S. Pat. No. 6,662,356 to Edwards et al., issued Dec. 9, 2003, is incorporated herein by reference.

BACKGROUND

Coupling in software indicates the degree of interconnection between software components such as routines, classes and modules. Tighter coupling may increase the chance that a fault in one of the components will cause a failure in other components, may increase the chance that changes in one component will cause problems in other components, and may increase programmer time in understanding the details of other components.

Metrics to measure coupling in software have been suggested. Some coupling metrics have been informal and subjective, while others have been precisely defined. Coupling has been identified and measured by analyzing the software specifications or the source code. Code implementation may deviate significantly from the software specifications, therefore coupling metrics derived from the specifications may inaccurately represent the coupling of the code as actually implemented. Deriving coupling metrics from source code must be done in a manner that is very specific to the language of the source code.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Coupling metrics of software are extracted automatically from compiled code of the software. For example, the compiled code may be binary machine code, or machine-independent intermediate code that is convertible into binary machine code by a just-in-time compiler.

The compiled code may be compiled from source code written in an object-oriented programming language, or from source code written in a procedural (i.e. non-object-oriented) programming language, or from any combination thereof.

A coupling metrics system includes a reader to access compiled code and its symbol table information, and a coupling metrics extraction component to calculate coupling metrics from the compiled code and its symbol table information. The coupling metrics system may be part of an integrated development environment (IDE) system.

BRIEF DESCRIPTION OF THE DRAWINGS AND APPENDIX

Embodiments are illustrated by way of example and not limitation in the figures of the accompanying drawings, in which like reference numerals indicate corresponding, analogous or similar elements, and in which.

Figure 1:
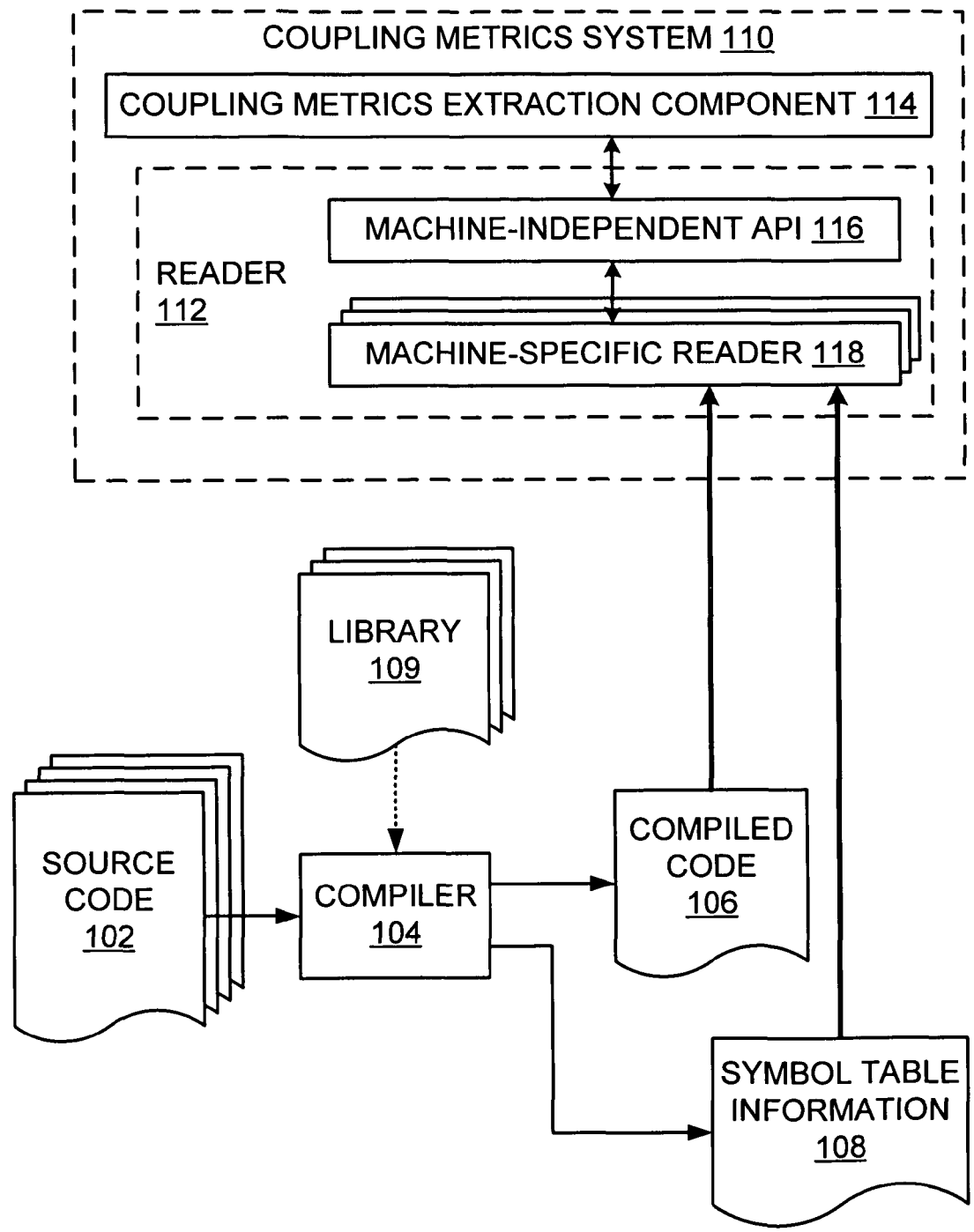
FIG. 1 illustrates the generation of compiled code from source code and a system for extraction of coupling metrics.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

In the following detailed description, numerous specific details are set forth in order to provide a thorough understanding of embodiments of the invention. However it will be understood by those of ordinary skill in the art that the embodiments may be practiced without these specific details. In other instances, well-known methods, procedures and components have not been described in detail so as not to obscure the embodiments of the invention.

In embodiments of the invention, coupling metrics of software are extracted automatically from compiled code of the software. The compiled code may be binary machine code—for example, x64 binaries, "ITANIUM®" binaries, x86 binaries, and the like—or machine-independent intermediate code that is convertible into binary machine code by a just-in-time compiler. "JAVA®" bytecode that is interpretable by a "JAVA®" virtual machine is an example of machine-independent intermediate code. "MICROSOFT®" .NET Common Intermediate Language (CIL), also known as "MICROSOFT®" Intermediate Language (MSIL), is another example of machine-independent intermediate code. A number of languages such as C#, Visual Basic, Cobol, J#, etc. can be compiled to MSIL. Executables (e.g.EXE files), object code, drivers (e.g. .SYS files), and dynamic libraries (e.g. DLL files) are all examples of binary machine code files. Other examples of binary machine code files include executables in the common object file format (COFF), executable and linking format (ELF), and other binary formats on various operating systems, ranging from cellphone operating systems to large enterprise servers.

It has generally been assumed in the past that it is not possible to extract from compiled code information that can be used for analysis. Compiled code has been generally been viewed as a non-parseable entity. It has therefore been easier to parse the source code or specifications to get coupling information. Moreover, in order to examine the compiled code, one first must have access to the compiled code. For very large versioned code, for example, an operating system such as Linux, this is not a trivial task. In an academic research environment, for example, researchers may not have the technical expertise required to build the binary machine code of Linux in the lab. It has therefore been simpler for these researchers to, inspect the Linux source code itself to extract coupling and other relevant metrics.

The inventors have nonetheless been motivated to extract coupling metrics from compiled code rather than from the source code or software specifications, for at least the following reasons:

a) The compiled code is independent of the programming language in which the source code is written.

b) Extraction of coupling metrics from compiled code scales better than derivation of coupling metrics from source code. This is critical for using this technology in large and very large software systems.

c) If the coupling metrics are derived from the source code, then source control versions of all of the source code that eventually is compiled into the software package need to be integrated prior to the derivation. This is difficult to achieve when developing very large-scale software, both in a proprietary software environment and also in an open-source environment. In contrast, coupling metrics may be extracted automatically and directly from the compiled code used in each release or internal build of a particular software package.

d) Compiled code is more complete and more accurate than source code, and certainly more complete and more accurate than software specifications. For example, if source code has a dependency on a particular library, coupling metrics derived from the source code will not capture satisfactorily the connection with the library. If the source code is compiled without the library, and the compiled code links to the library at runtime, then extracting coupling metrics from that compiled code will not identify any coupling that occurs at runtime. If the source code is compiled with the library, then coupling to those libraries (and features of those libraries) will be identified when extracting coupling metrics from the compiled code. Therefore, by extracting coupling metrics from the compiled code, one can analyze different modules and libraries in isolation, and one can also build and analyze an entire software system.

e) Analyzing source code is more cumbersome than analyzing compiled code, because source code needs to be linked to other files, whereas a compiled code file can be inspected individually.

f) Some software component architectures, for example, the "MICROSOFT®" Component Object Model (COM) and the "MICROSOFT®" .NET framework and NeXT's Portable Distributed Objects (PDO), are based on compiled code. Software that is developed in a compiled-code-based software component architecture may be released as collections of compiled code files, and failures in the software may be mapped back to each compiled code file. Therefore it is convenient to determine coupling metrics on a per-compiled code file basis for such software.

FIG. 1 illustrates the generation of compiled code from source code and a system for extraction of coupling metrics. One or more files of source code 102 are compiled by a compiler 104 into compiled code 106. Compilation of source code 102 by compiler 104 also results in the output of symbol table information 108. "MICROSOFT®" .PDB files are an example of symbol table information files. When generating compiled code 106 and symbol table information 108, compiler 104 may also compile one or more libraries 109 whose contents are referred to by source code 102, so that the relevant content of one or more libraries 109 is included in compiled code 106.

The architecture of an exemplary coupling metrics system 110 is shown in FIG. 1. System 110 includes a reader 112 to provide access to compiled code 106 and symbol table information 108. System 110 also includes a coupling metrics extraction component 114 that is coupled to reader 112. (In alternate architectures, reader 112 is incorporated in coupling metrics extraction component 114.) Component 114 computes various coupling metrics for compiled code 106. System 110 may also include one or more additional components (not shown) coupled to component 114 to present the metrics computed by component 114 in a user-friendly manner.

In some embodiments, reader 112 may provide a level of abstraction so that component 114 is independent of the machine (virtual or otherwise) with which compiled code 106 is compatible. For example, reader 112 may include a machine-independent application program interface (API) 116 which is called by component 114, and one or more machine-specific readers 118, each of which implements the functionality of API 116 for a particular machine.

For example, reader 112 may use Vulcan technology, which is described in Srivastava, A., Edwards A., Vo, H., *Vulcan: Binary Transformation in a distributed environment*, Technical Report MSR-TR-2001-50, Microsoft Research (Apr. 20, 2001). Vulcan technology is also further described in U.S. Pat. Nos. 6,460,178; 6,481,008; 6,609,248; 6,662,356; and 6,802,056, and in U.S. Patent Publication No. 2000/5010891, all of which are assigned to the assignee of this application. In particular, U.S. Pat. No. 6,662,356 describes an application program interface (API) certain calls of which may be used by reader 112 to access and inspect compiled code 106 and symbol table information 108. In another example, reader 112 may use "PE Explorer™", which is commercially available from Heaventools Software of Vancouver, B.C., Canada, in order to access and inspect .EXE files, .DLL files and others, and "MICROSOFT®" Debug Interface Access Software Development Kit (DIA SDK) in order to access the information in a .PDB file.

Some of the functionality that reader 112 is capable of performing includes:

a) opening compiled code 106 and symbol table information 108;

b) enumerating global variables from symbol table information 108;

c) enumerating procedures from symbol table information 108;

d) reading instructions of procedures;

e) identifying local variables of procedures;

f) identifying parameters of the procedure;

g) identifying whether a symbol is a class;

h) identifying member variables of a class;

i) identifying member functions of a class;

j) identifying parameters of member functions of a class;

k) identifying local variables of member functions of a class;

l) identifying return values of member functions of a class; and m) identifying base classes of a class.

The coupling metrics to be collected by component 114 include, for example, the following global variable and procedure coupling metrics. In other implementations, more, fewer, and/or different coupling metrics could be used.

Read Coupling—this metric for a particular procedure indicates the number of global variables that are read by the procedure. The procedure is therefore coupled to those global variables through read. For example, in the following code snippet, the procedure Foo is coupled to the global variable globalVar through read, and therefore the procedure Foo has a Read Coupling of 1.

```
int globalVar = 1;
void Foo(int *j)
{
    if (j)
    {
        *j=10*globalVar;
    }
}
```

Write Coupling—this metric for a particular procedure indicates the number of global variables that are written by the procedure. The procedure is therefore coupled to those global variables through write. For example, in the following code snippet, the procedure Foo is coupled to the global variable globalVar through write, and therefore the procedure Foo has a Write Coupling of 1.

```
int globalVar = 1;
void Foo( )
{
    globalVar = 2;
}
```

Address Coupling—this metric for a particular procedure indicates the number of global variables whose address is taken by the procedure. The procedure is therefore coupled to those global variables through taking their address. For example, in the following code snippet, the procedure FooBar is coupled to the global variable coupledStruct by taking its address, and therefore the procedure FooBar has an Address Coupling of 1.

```
struct globalStruct
{
    int a;
    int b;
} coupledStruct;
void FooBar( struct globalStruct &coupledStruct )
{
    //
    // access global struct
    //
}
```

Array accesses are translated to address dereferences in compiled code. Sometimes it is not possible to clearly identify the offset at which a write is occurring—for example, when analyzing a loop where multiple locations in an array may be written to. In such cases, the coupling is classified as Address Coupling.

Procedure Coupling—this metric is calculated using global variables. If a global variable is set in ProcedureA( ) and is modified in ProcedureB( ) and ProcedureC( ), a coupling value of two is shown for ProcedureA( ). The Procedure Coupling for the compiled code as a whole is an aggregation of individual coupling between procedures contained in the compiled code.

Figure 2:
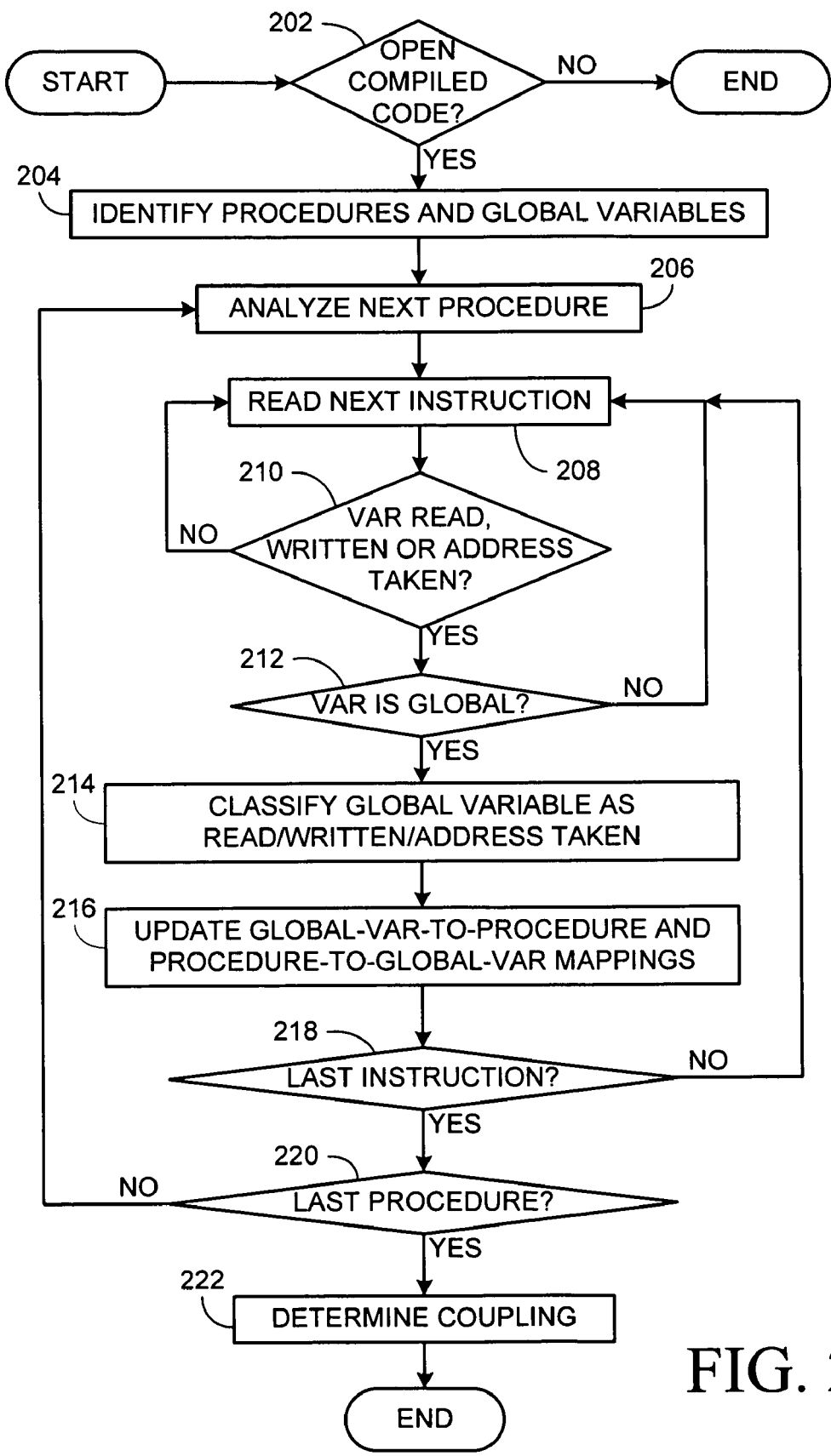
FIG. 2 is a flowchart of an exemplary method for extracting global variable and procedure coupling metrics from compiled code.

FIG. 2 is a flowchart of an exemplary method for extracting global variable and procedure coupling metrics from compiled code. The method of FIG. 2 is implemented by coupling metrics system 110. At 202, an attempt to open compiled code 106 and symbol table 108 is made. If the attempt is unsuccessful, the method ends.

If compiled code 106 and symbol table 108 are successfully opened, then at 204, the procedure symbols and global variables in compiled code 106 and symbol table 108 are identified by reader 112. Any procedures inserted into compiled code 106 by compiler 104 are ignored as they are not present in source code 102. To identify the global variables, all global sections in compiled code 106 which refer to data blocks are enumerated. If the variable can be resolved as a global variable where the name of the variable and its type are known, the variable is inserted into a list of unique global variables.

Sample source code globalcouplingsample.cpp is provided in Appendix A. In that sample source code, there are nine procedures: a, b, c, d, e, f, g, h and i; and several global variables: glo1, glo2, waycool.aMember, waycool.anArray, and the various components of inAnArrayToo.

For each procedure, each instruction in compiled code 106 is checked. At 206, the first procedure is analyzed, and at 208, the first instruction of the procedure being analyzed is read. In globalcouplingsample.cpp, the first procedure checked is b.

At 210, memory addressing is specifically checked to see if the address of a variable is taken, or if a variable is read or written. If no such variable usage occurs, the method continues at 208 where the next instruction of the procedure being analyzed is read.

If the address of a variable is taken, or if a variable is read or written, then checks are done at 212 to determine whether this is a global variable. If the name of the variable cannot be deciphered, the variable is ignored.

If the variable is identified as a global variable, then it is classified at 214 as read, written or address taken, and at 216, global-variable-to-procedure and procedure-to-global-variable mappings are updated.

This analysis is repeated for each instruction of the procedure until the last instruction has been analyzed, which is checked at 218. If the procedure is not the last in the compiled code, checked at 220, then the method continues at 206 where the next procedure is analyzed. Once all the procedures have been analyzed, the coupling is determined at 222.

For example, when reading the compiled instructions resulting from a (glo1) in procedure b, the variable glo1 is read. glo1 is identified as a global variable, and therefore a procedure-to-global-variable table for procedure b is dynamically generated, listing the global variable glo1 and identifying by the setting of a bit value that procedure b reads glo1.

| Table for procedure b | | | |
|---|---|---|---|
| Global Var | Reads | Writes | Takes Address |
| glo1 | 1 | 0 | 0 |

In a global-variable-to-procedure table, procedure b is listed in the "read by" column for the row corresponding to glo1.

| Table for global variables | | | |
|---|---|---|---|
| Global Var | Read by | Written to by | Address Taken by |
| glo1 | b | | |
| glo2 | | | |

When reading the compiled instructions resulting from a (glo1) in procedure b, the procedure a is called. So procedure a is then analyzed. When reading the compiled instructions resulting from glo2=i, the variable glo2 is written to glo2 is identified as a global variable, and therefore a procedure-to-global-variable table for procedure a is dynamically generated, listing the global variable glo2 and identifying by the setting of a bit value that procedure a writes to glo2.

Table for procedure a

| Global Var | Reads | Writes | Takes Address |
|---|---|---|---|
| glo2 | 0 | 1 | 0 |

In the global-variable-to-procedure table, procedure a is listed in the "written to by" column for the row corresponding to glo2.

Table for global variables

| Global Var | Read by | Written to by | Address Taken by |
|---|---|---|---|
| glo1 | b | | |
| glo2 | | a | |

Analysis of all the instructions in globalcouplingsample.cpp results in the following additional tables of procedure-to-global-variable mappings:

Table for procedure d

| Global Var | Reads | Writes | Takes Address |
|---|---|---|---|
| glo2 | 0 | 0 | 1 |

Table for procedure c

| Global Var | Reads | Writes | Takes Address |
|---|---|---|---|
| glo1 | 0 | 1 | 0 |

Table for procedure e

| Global Var | Reads | Writes | Takes Address |
|---|---|---|---|
| wayCool.aMember | 0 | 1 | 0 |

Table for procedure g

| Global Var | Reads | Writes | Takes Address |
|---|---|---|---|
| glo1 | 1 | 0 | 0 |
| wayCool.anArray[*] | 0 | 1 | 0 |

Table for procedure h

| Global Var | Reads | Writes | Takes Address |
|---|---|---|---|
| glo1 | 1 | 0 | 0 |
| glo2 | 1 | 0 | 0 |
| inAnArrayToo[*].aMember | 0 | 0 | 1 |

Table for procedure i

| Global Var | Reads | Writes | Takes Address |
|---|---|---|---|
| glo1 | 1 | 0 | 0 |
| glo2 | 1 | 0 | 0 |
| inAnArrayToo[*].anArray[2] | 0 | 0 | 1 |

The complete global-variable-to-procedure table is as follows:

Table for global variables

| Global Var | Read by | Written to by | Address Taken by |
|---|---|---|---|
| glo1 | b, g, h, i | c | |
| glo2 | h, i | a | d |
| wayCool.aMember | | e | |
| wayCool.anArray | | g | |
| inAnArrayToo[*].aMember | | | h |
| inAnArrayToo[*].anArray[2] | | | i |

Figure 3:
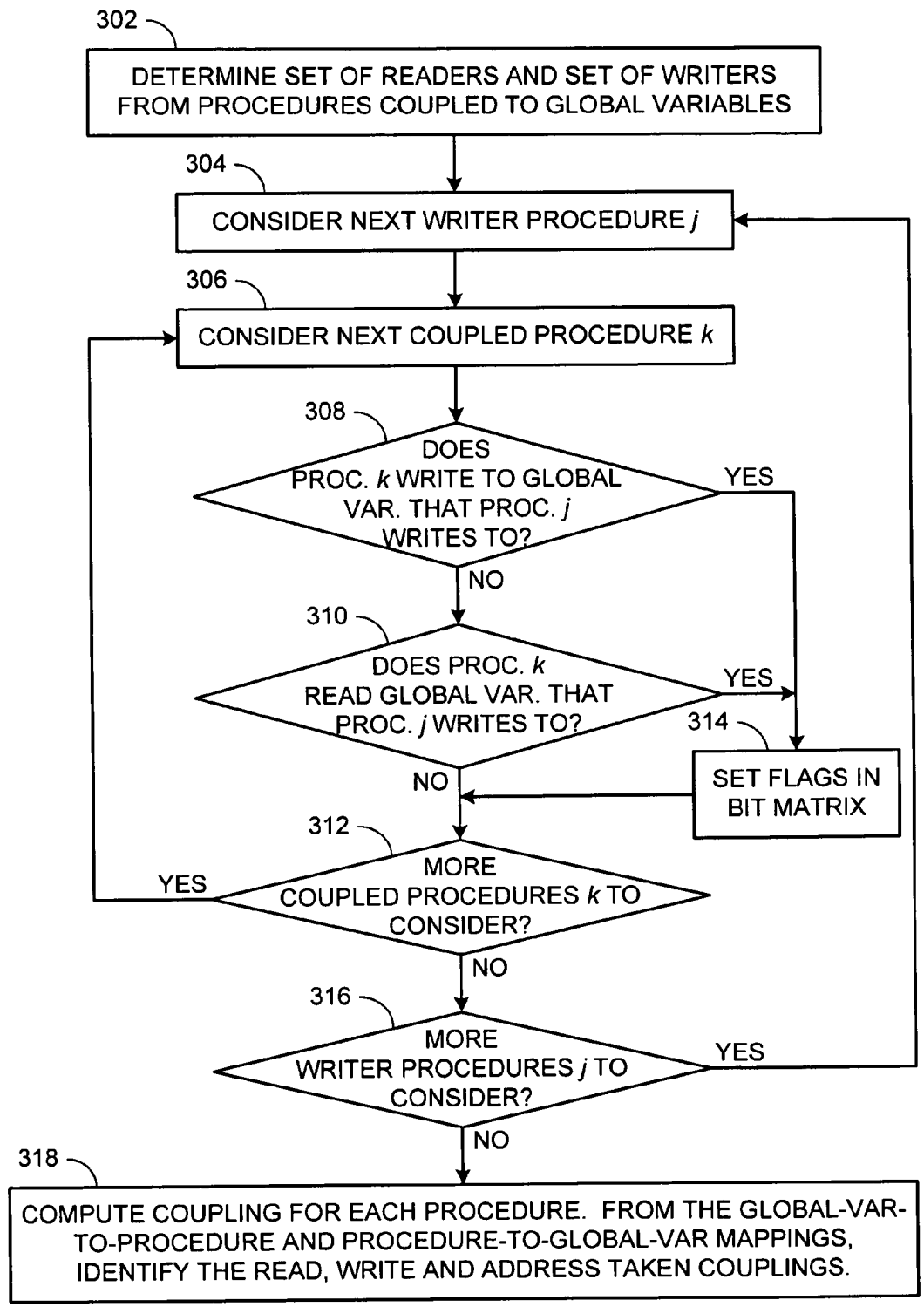
FIG. 3 is a flowchart of an exemplary method for determining coupling among global variables and procedures.

At this point the coupling is determined. FIG. 3 is a flowchart of an exemplary method to determine global variable and procedure coupling, and is an example of the determination at 222 of FIG. 2.

At 302, a set of "reader" procedures and a set of "writer" procedures are determined from the procedures that are coupled to global variables. A procedure that reads one or more of the global variables is a "reader". A procedure that writes to or takes the address of one or more of the global variables is a "writer". It is possible for the same procedure to be both a "reader" and a "writer". In the globalcouplingsample.cpp example, the set of "reader" procedures consists of procedures b, g, h and i, and the set of "writer procedures" consists of procedures a, c and d. None of the procedures belong to both sets, and procedures e and f do not belong to either set since they are not coupled to any global variables.

Coupling between procedures is calculated as follows. A "writer" procedure that writes to or takes the address of a particular global variable is coupled to all other procedures that read, write to or take the address of that global variable. A "reader" procedure that reads the address of a particular global variable is coupled to all other procedures that write to or take the address of that global variable. A procedure is not coupled to itself.

If n is the number of procedures that is coupled to global variables, then an n×n bit matrix is generated. At 304, a loop over all the "writer" procedures begins. The "writer" procedure under consideration is procedure j., where j is an index over the "writer" procedures. At 306, a first coupled procedure k is considered, where k is an index over all the procedures that are coupled to global variables, except procedure j, since a procedure is not coupled to itself.

At 308, it is checked whether procedure k writes to (or takes the address of) a global variable that procedure j writes to (or takes the address of). If not, then at 310 it is checked whether procedure k reads a global variable that procedure j writes to (or takes the address of). If neither check succeeds, then if there are more coupled procedures k to consider (checked at 312), the method continues to 306 with the next coupled procedure.

If procedure k writes to, takes the address of or reads a global variable that procedure j writes to or takes the address of, then at 314 the appropriate flags in the bit matrix are set to indicate coupling between procedure j and procedure k, and the method continues to 312.

Once all the coupled procedures (except for procedure j) have been considered, then if there are more "writer" procedures to consider (checked at 316), the method continues to 304 with the next "writer" procedure.

In the globalcouplingsample.cpp example, for "writer" procedure a, the coupled procedures b, c, d, g, h, and i are considered one at a time. The 7×7 bit matrix will have the following flags set after considering these coupled procedures vis-à-vis "writer" procedure a. The diagonal of the matrix has bits set to zero, since a procedure is not coupled to itself.

|   | a | b | c | d | g | h | i |
|---|---|---|---|---|---|---|---|
| a | 0 | 0 | 0 | 1 | 0 | 1 | 1 |
| b | 0 | 0 | 0 | 0 | 0 | 0 | 0 |
| c | 0 | 0 | 0 | 0 | 0 | 0 | 0 |
| d | 1 | 0 | 0 | 0 | 0 | 0 | 0 |
| g | 0 | 0 | 0 | 0 | 0 | 0 | 0 |
| h | 1 | 0 | 0 | 0 | 0 | 0 | 0 |
| i | 1 | 0 | 0 | 0 | 0 | 0 | 0 |

After considering all the "writer" procedures, the 7×7 bit matrix will have the following flags set:

|   | a | b | c | d | g | h | i |
|---|---|---|---|---|---|---|---|
| a | 0 | 0 | 0 | 1 | 0 | 1 | 1 |
| b | 0 | 0 | 1 | 0 | 0 | 0 | 0 |
| c | 0 | 1 | 0 | 0 | 1 | 1 | 1 |
| d | 1 | 0 | 0 | 0 | 0 | 1 | 1 |
| g | 0 | 0 | 1 | 0 | 0 | 0 | 0 |
| h | 1 | 0 | 1 | 1 | 0 | 0 | 0 |
| i | 1 | 0 | 1 | 1 | 0 | 0 | 0 |

Procedure b is coupled to procedure c, because procedure b reads global variable glo1 and glo1 is written to by procedure c. Procedure c is coupled to procedures b, g, h and i, because glo1 is written to by procedure c and read by procedures b, g, h and i. Procedure d is coupled to procedures a, h and i, because procedure d takes the address of global variable glo2, which is written to by procedure a and read by procedures h and i.

At 318, once each "writer" procedure has been fully analyzed vis-à-vis the coupled procedures, the coupling metrics are calculated. For each coupled procedure, its Procedure Coupling metric is calculated by adding the bits in the row of the bit matrix corresponding to the coupled procedure. By consulting the table for global variables and/or the table for the coupled procedure, the Read Coupling, Write Coupling and Address Coupling metrics defined above are calculated.

In the globalcouplingsample.cpp example, the results the coupling metrics calculation are summarized in the following table.

| Global Variable & Procedure Coupling Metrics | | | | |
|---|---|---|---|---|
| Procedure Name | Read Coupling | Write Coupling | Address Coupling | Procedure Coupling |
| a | 0 | 1 | 0 | 3 |
| b | 1 | 0 | 0 | 1 |
| c | 0 | 1 | 0 | 4 |
| d | 0 | 0 | 1 | 3 |
| e | 0 | 1 | 0 | 0 |
| f | 0 | 0 | 0 | 0 |
| g | 1 | 1 | 0 | 1 |
| h | 2 | 0 | 1 | 3 |
| i | 2 | 0 | 1 | 3 |
| total | 6 | 4 | 3 | 18 |

Overall for the compiled code in the globalcouplingsample.cpp example, there is a Read Coupling metric of 6, a Write Coupling metric of 4, an Address Coupling metric of 3, and a Procedure Coupling metric of 18.

The various global variable and procedure coupling metrics computed using the method of FIG. 3 may be provided as output of coupling metrics system 110.

Accurate calculation of the global variable and procedure coupling metrics described above depends upon the proper identification of global variables. In some cases, a global variable is not referenced directly and heuristics may be used to decipher the name of the variable. Consider the following example of code:

```
1    struct FOO
2    {
3        int a;
4        int b;
5    }
6    aFoo[10];
7
8    void f1( )
9    {
10       for (int i=0; i<10; i++)
11       {
12           aFoo[i].b=i;
13       }
14   }
15
16   int f2( )
17   {
18       int sum=0;
19       for (int i=0; i<10; i++)
20       {
21           sum +=aFoo[i].a;
22       }
23   }
```

In the example above, functions f1 and f2 are not globally coupled as they write to different regions in memory. So it is important to resolve the differences clearly. This problem is solved with a heuristic based on type information plus the rich addressing mode information through the symbol information table. Specifically, a memory operand can contain a base, an optional index register with scale, and an optional offset. When an operand which has a base pointing to an array is observed, one looks for a (variable) index indicating the scale (which is the size of the array element) and an optional offset. Using this information, one can conclude that the operand accesses a specific element of the array. Assuming an 'int' consumes 4 bytes, in the examples above the base is 'aFoo', there is an index register with scale 8, then the offset is 4 for function 'f1' and 0 (zero) for function 'f2'. The names are synthesized as 'aFoo[*].b' and 'aFoo[*].a', respectively, and since the names are different there is no global coupling present.

The coupling metrics to be collected by component 114 includes, for example, the following class coupling metrics. In other implementations, more, fewer, and/or different coupling metrics could be used.

Base Class Coupling—this metric indicates the coupling of a class through base classes. For example, in the following code snippet, Bar is a class and Foo is coupled to Bar as it inherits from Bar.

```
class Foo: class Bar
{
    ...
};
```

Class Member Variable Coupling—this metric indicates the coupling of a class to other classes through member variables of the class. For example, in the following code snippet, Bar is a class and Foo is coupled to Bar through the member variable myBar.

```
class Foo
{
    private:
        Bar myBar; // Bar is a class
};
```

Class Function Parameter Coupling—this metric indicates the coupling of a class to other classes through parameters that are passed into the function. For example, in the following code snippet, the member function FooBar of class Foo has a parameter myBar that is a class Bar.

```
class Foo
{
    public:
        void FooBar(Bar *myBar);    // Bar is a class
};
```

Class Function Local Variable Coupling—this metric indicates the coupling of a class to other classes through local variables stored in the function stack. For example, in the following code snippet, the member function FooBar of class Foo has a local variable myBar that is a class Bar.

```
class Foo
{
    public:
        void FooBar( );
}
void FooBar( )
{
    Bar myBar; // Bar is a class
};
```

Return Value Coupling—this metric indicates the coupling of a class to other classes through return value of a member function. There can be implicit conversions. For example, in the following code snippet, the member function FooBar of class Foo returns a value that is a class Bar.

```
class Foo
{
    public:
        // FooBar returns Bar
        Bar* FooBar( )
        {
            ...
        };
}
```

Total Cyclic Class Coupling—this metric is calculated for a single compiled code. For example, "ClassA depends on ClassB" and "ClassB depends on ClassA".

Figure 4:
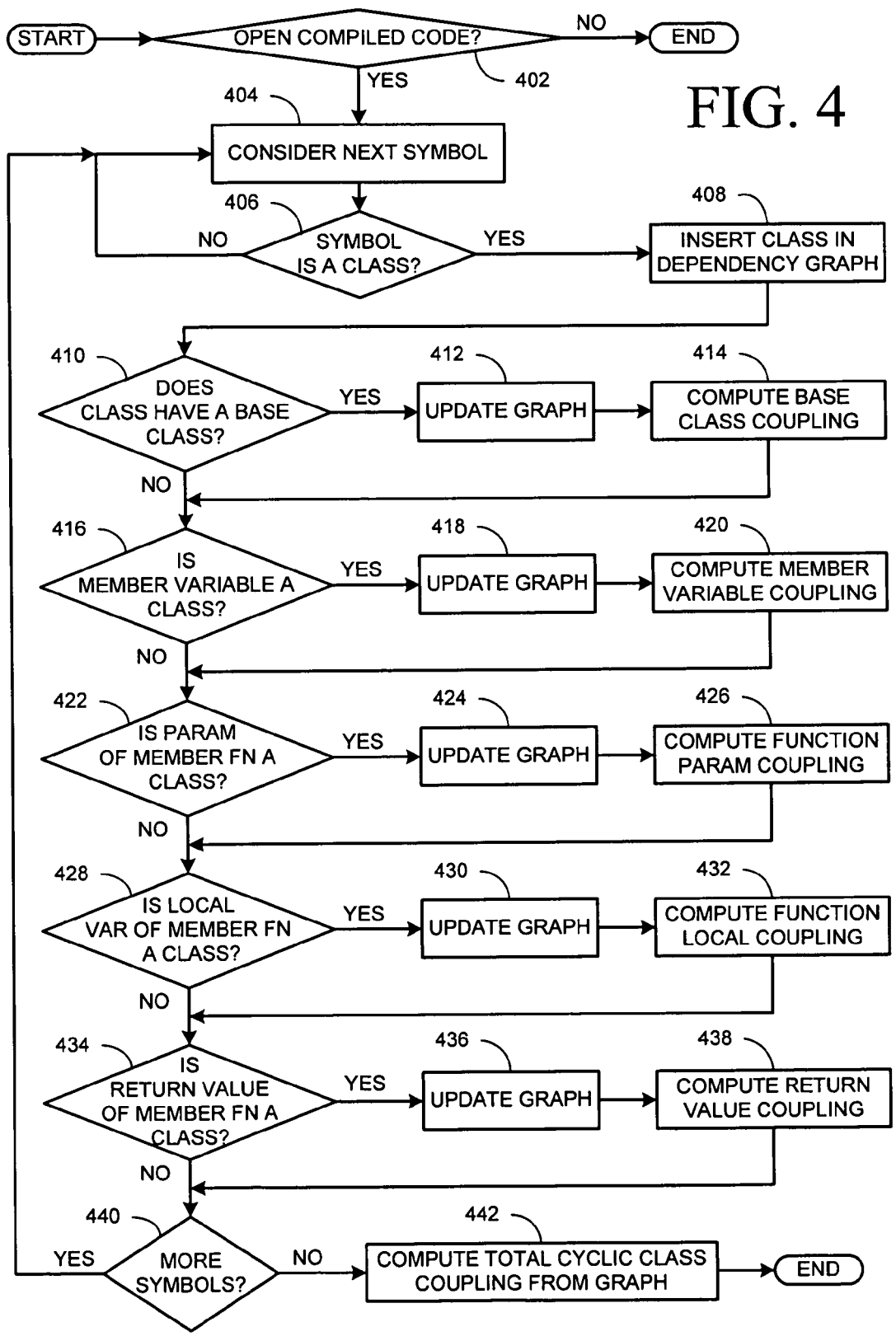
FIG. 4 is a flowchart of an exemplary method for extracting class coupling metrics from compiled code.

FIG. 4 is a flowchart of an exemplary method for extracting class coupling metrics from compiled code. The method of FIG. 4 is implemented by coupling metrics system 110. At 402, an attempt to open compiled code 106 and symbol table 108 is made. If the attempt is unsuccessful, the method ends.

If compiled code 106 and symbol table 108 are successfully opened, the symbols in compiled code 106 and symbol table 108 are identified by reader 112. Each symbol is checked. At 404 the first symbol is considered, and at 406 it is checked whether the symbol being considered is a class. If not, then the next symbol is considered at 404. If the symbol is identified as a class, say ClassX, then a node representing the class is added to a class dependency graph at 408, if the node is not already in the graph.

The class is then examined at 410 to see whether it has any base classes, i.e. whether ClassX inherits from another class. If so, then the class dependency graph is updated at 412 as follows. If a node representing the base class (also known as a parent class) is not already in the graph, the node is added. If not already present, a directed arc from the node representing ClassX to the node representing the base class is added to the graph. This arc represents the dependency of ClassX on its base class. Steps 410 and 412 are repeated for each base class from which ClassX inherits, since multiple inheritance is possible. At 414, the base class coupling of ClassX is computed. For example, if ClassX inherits from ClassA and also from ClassB, then ClassX has a base class coupling of 2. (It is obvious to one of ordinary skill in the art to replace the base class coupling metric with a derived class coupling metric.)

After 414, or if ClassX has no base classes, then member variables, if any, of ClassX are checked at 416 to see whether they are classes. If a member variable of ClassX is a class, then the class dependency graph is updated at 418 as follows. If a node representing the member variable class is not already in the graph, the node is added. If not already present, a directed arc from the node representing ClassX to the node representing the member variable class is added to the graph. This arc represents the dependency of ClassX on its member variable. Steps 416 and 418 are repeated for each member variable of ClassX that is a class. At 420, the class member variable coupling of ClassX is computed.

After 420, or if ClassX has no member variables that are classes, then member functions, if any, of ClassX are checked at 422 to see whether they have parameters that are classes. If a parameter of a member function of ClassX is a class, then the class dependency graph is updated at 424 as follows. If a node representing the parameter of the member function is not already in the graph, the node is added. If not already present, a directed arc from the node representing ClassX to the node representing the parameter of the member function is added to the graph. This arc represents the dependency of ClassX on the parameter of its member function. Steps 422 and 424 are repeated for each parameter that is a class, and for each member function of ClassX. At 426, the class function parameter coupling of ClassX is computed.

After 426, or if ClassX has no member functions with parameters that are classes, then member functions, if any, of ClassX are checked at 428 to see whether they have local variables that are classes. If a local variable of a member function of ClassX is a class, then the class dependency graph is updated at 430 as follows. If a node representing the local variable of the member function is not already in the graph, the node is added. If not already present, a directed arc from the node representing ClassX to the node representing the local variable of the member function is added to the graph. This arc represents the dependency of ClassX on the local variable of its member function. Steps 428 and 430 are repeated for each local variable that is a class, and for each member function of ClassX. At 432, the class function local variable coupling of ClassX is computed.

After 432, or if ClassX has no member functions with local variables that are classes, then member functions, if any, of ClassX are checked at 434 to see whether their return value is a class. If a member function of ClassX has a return value that is a class, then the class dependency graph is updated at 436 as follows. If a node representing the return value of the member function is not already in the graph, the node is added. If not already present, a directed arc from the node representing ClassX to the node representing the return value of the member function is added to the graph. This arc represents the dependency of ClassX on the return value of its member function. Steps 434 and 436 are repeated for each return value that is a class, and for each member function of ClassX. At 438, the return value coupling of ClassX is computed.

After 438, or if ClassX has no member functions with return values that are classes, then it is checked at 440 whether there are any other symbols to be considered. If so, then the method continues at 404 where the next symbol is considered.

It is obvious to one of ordinary skill in the art to analyze and determine the various types of couplings in a different order. It is also obvious to one of ordinary skill in the art to analyze a particular member function of a particular class for function parameter coupling, function local variable coupling and return value coupling before analyzing another member function of the particular class for the same types of couplings.

If all the symbols have been considered, then at 442, the total cyclic class coupling for the compiled code is computed from the class dependency graph. By traversing the arcs, cycles of class dependencies are identified and counted. Whether the arc was created to represent base class coupling, class member variable coupling, class function parameter coupling, class function local variable coupling, or return value coupling is not important, although in alternative implementations separate class dependency graphs could be created for each type of coupling. A two-class cycle is one in which two classes depend on each other and is identified by two nodes having two directed arcs therebetween, one in each direction.

Figure 5:
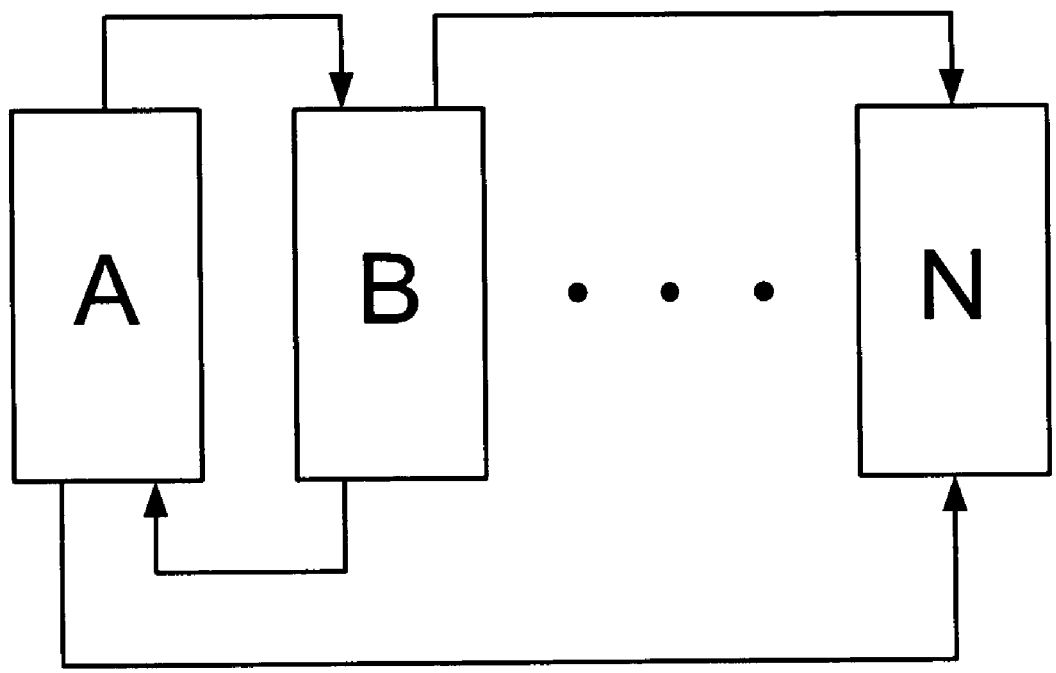
FIG. 5 is an example class dependency graph.

FIG. 5 is an example class dependency graph, showing nodes for ClassA, ClassB . . . and ClassN. According to the graph, ClassA depends on ClassB and on ClassN, and ClassB depends on ClassA and on ClassN. This graph has one two-class cycle between ClassA and ClassB. In other implementations, cycles comprising more than two classes could also be considered.

The following is a sample of object-oriented source code the compiled code of which could be analyzed using the method of FIG. 4. The sample source code is written in C++ and includes features compatible with the "MICROSOFT®" .NET framework. The lines of the sample source code that are relevant to this discussion are highlighted with bold font.

```
1    class Class1
2    {
3    public:
4        Class1( ) throw( );
5        ~Class1( ) thrown( );
6
7        void PrintCharBuffer( ) throw( );
8        void PrintOther( ) throw( );
9        void PrintOther2( Class2 &cc3 ) throw( );
10
11   private:
12       /// initialize the variables
13       void Initialize( ) throw( );
14       /// finalize or cleanup
15       void Finalize( ) throw( );
16       /// assignment operator not implemented
17       Class1& operator=( const Class1& rhs ) throw( );
18       /// copy ctor - not implemented
19       Class1(const Class1 & rhs) throw( );
20
21       CHeap localHeap;      // class CHeap instance
22       Class2 cc2;           // class Class2
23       PCHAR pCharPtr;
24       DWORD size;
25   };
26
27   class Class2
28   {
29   public:
30       Class2( ) throw( );
31       ~Class2( ) throw( )
32
33       void PrintCharBuffer( ) throw( );
34       void PrintOther( ) throw( );
35
36   private:
37       /// initialize the variables
38       void Initialize( ) throw( );
39       /// finalize or cleanup
40       void Finalize( ) throw( );
41       /// assignment operator not implemented
42       Class2& operator=( const Class2& rhs ) throw( );
43       /// copy ctor - not implemented
44       Class2(const Class2 & rhs) throw( );
45
46       CHeap localHeap;      // class CHeap instance
47       PCHAR pCharPtr;
48       DWORD size;
49   };
50
51   void Class2::PrintOther( ) throw( )
52   {
53       Class1 cc1;       // cc1 is Class1 instance
54       cc1.PrintCharBuffer( );
55   }
```

There are classes Class1 and Class2 in this sample source code. Class1 is coupled to Class2 and CHeap through member variables, as shown at lines 22 and 21, respectively. Class2 is coupled to CHeap through a member variable, as shown at line 46. Class2 is coupled to Class1 through a local variable declaration in void Class2::PrintOther( ) throw( ), as shown at line 53.

Class1 doesn't have coupling through base classes, return values, local variables or function parameters. The overall class coupling value for Class1 is 2.

Class2 doesn't have coupling through base classes, return values or function parameters. But it does have coupling through class member definitions and local variable definitions. The overall class coupling value for Class2 is 2.

Class1 and Class2 are also cyclically coupled, since Class1 depends on Class2 and Class2 depends on Class1. So the total cyclic class coupling metric for this code sample is 1.

The various class coupling metrics computed using the method of FIG. 4 may be provided as output of coupling metrics system 110.

Some embodiments of the invention may be described in the general context of computer-executable instructions, such as program modules, executed by one or more computers or other devices. Generally, program modules include routines, programs, procedures, functions, dynamic linked libraries (DLLs), applets, native instructions, objects, components, data structures, etc. that perform particular tasks or implement particular abstract data types. Typically the functionality of the program modules may be combined or distributed as desired in various embodiments.

A coupling metrics system such as described hereinabove may be included in an integrated development environment (IDE), also known as an integrated design environment and as an integrated debugging environment. A non-exhaustive list of examples of IDEs includes "MICROSOFT®" "VISUAL STUDIO®", "ECLIPSE™", "JBUILDER®" and "NETBEANS™".

Figure 6:
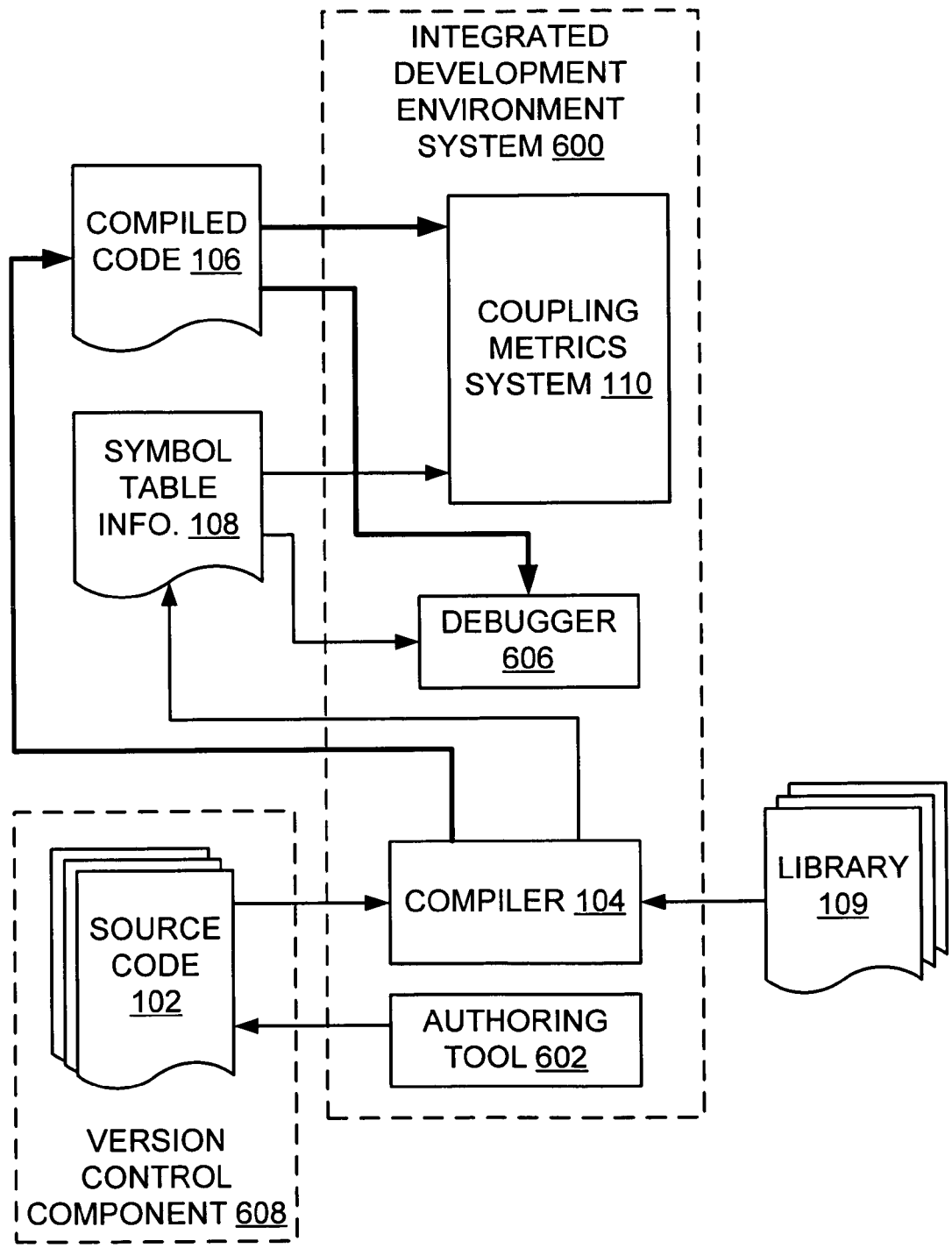
FIG. 6 is a block diagram of an IDE system.

FIG. 6 is a block diagram of an IDE system. An IDE system 600 includes compiler 104, and an authoring tool 602 to edit source code 102. IDE system 600 also includes a debugger 606 to enable analysis of the software as compiled code 106 is executed (which term includes interpretation of compiled code 106 by a virtual machine). IDE system 600 is able to be integrated with a source code version control component 608. Revision control software is publicly and commercially available. In some implementations, component 608 is included in IDE system 600.

IDE system 600 also includes coupling metrics system 110. After compiler 104 compiles source code 102 (and possibly one or more libraries 109), coupling metrics system 110 may extract coupling metrics from compiled code 106 and symbol table information 108 and provide feedback to the developer or integrator of the software. High values of coupling, or of certain types of coupling, may be flagged as a warning. Different flags may be associated with different values or ranges of values of coupling.

In another application, coupling metrics extracted from the compiled code may be used as a factor in software failure analysis. Statistical models may be fit to historical data to correlate these metrics with failures, and prediction equations (which likely also take into account the number of lines of compiled code or some other measure of the size of the compiled code) may be built from these models so that failure estimations can be made based, at least in part, on the values of these metrics.

In yet another application, coupling metrics extracted from the compiled code may be used as a measure of the testability and maintainability of the software.

In a further application, coupling metrics extracted from the compiled code may be used to analyze new compiled code on a large scale before the new compiled code is added to software that is considered ready for shipping.

Figure 7:
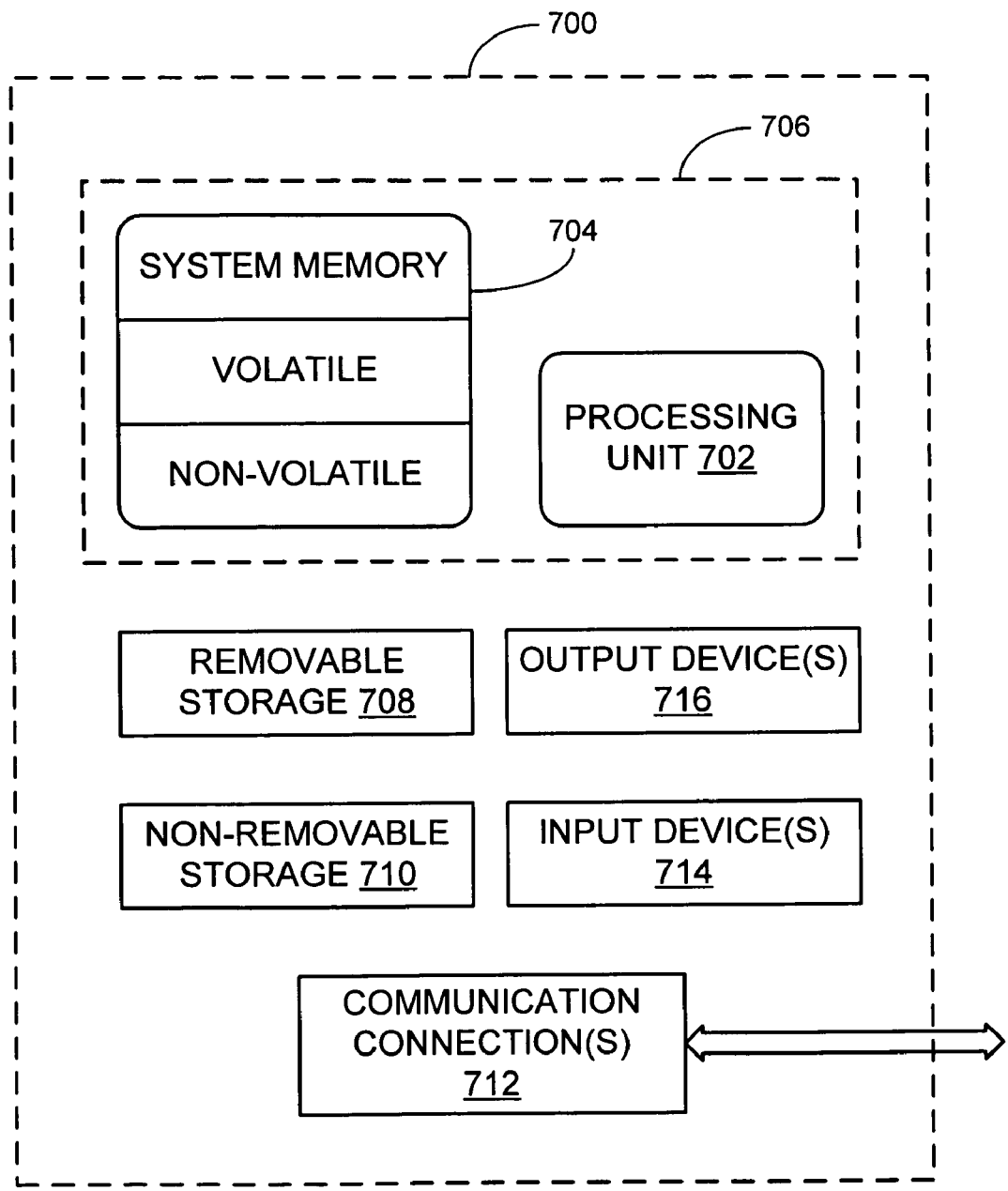
FIG. 7 illustrates an exemplary system for implementing embodiments of the invention, the system including one or more computing devices; and Appendix A is an exemplary sample of software source code.

FIG. 7 illustrates an exemplary system for implementing embodiments of the invention, the system including one or more computing devices, such as computing device 700. The terms "computing device" and "computer" not only include mainframes, servers and personal computers (e.g., desktop, laptop and notebook computers), but also other devices capable of processing data, such as PDAs (personal digital assistants), mobile telephones (e.g. smartphones), set-top boxes, gaming consoles, handheld gaming devices, and embedded computing devices (e.g. computing devices built into a car or ATM (automated teller machine)).

In its most basic configuration, device 700 typically includes at least one processing unit 702 and memory 704. Depending on the exact configuration and type of computing device, memory 704 may be volatile (such as random access memory (RAM)), non-volatile (such as read-only memory (ROM), flash memory, etc.) or some combination of the two. This most basic configuration is illustrated in FIG. 7 by dashed line 706.

Additionally, device 700 may also have additional features or functionality. For example, device 700 may also include additional storage (removable and/or non-removable) including, but not limited to, magnetic or optical disks or tape. Such additional storage is illustrated in FIG. 7 by removable storage 708 and non-removable storage 710.

Computer storage media includes volatile and nonvolatile, removable and non-removable media implemented in any method or technology for storage of information such as computer readable instructions, data structures, program modules or other data. Memory 704, removable storage 708 and non-removable storage 710 are all examples of computer storage media. Computer storage media includes, but is not limited to, random access memory (RAM), read-only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media may be part of device 700.

Device 700 may also contain communication connection(s) 712 that allow the device to communicate with other devices. Communication connection(s) 712 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media. The term computer readable media as used herein includes both storage media and communication media.

Device 700 may also have input device(s) 714 such as keyboard, mouse, pen, voice input device, touch input device, etc. Output device(s) 716 such as a display, speakers, printer, etc. may also be included. All these devices are well known in the art and need not be discussed at length here.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

APPENDIX A

This is an example source code globalcouplingsample.cpp.

```
1    #include <windows.h>
2    #include <cstudio>
3
4    int glo1;
5    int glo2;
6
7    struct STRUCTS_ARE_COOL
8    {
9        int aMember;
10       char anArray[12];
11   }
12   wayCool;
13
14   STRUCTS_ARE_COOL inAnArrayToo[6];
15
16   __declspec(noinline)
17   void a(int i)
18   {
19       printf ("a \n");
20       glo2=i;
21   }
22
23   __declspec(noinline)
24   void b( )
25   {
26       printf("b \n");
27       a(glo1);
28   }
29
30   __declspec(noinline)
31   void c(int *x)
32   {
33       printf("c \n");
34       glo1=*x;
35   }
36
37   __declspec(noinline)
38   void d( )
39   {
40       printf("d \n");
41       c(&glo2);
42   }
43
44   __declspec(noinline)
45   void e(int i)
46   {
47       printf("e \n");
48       wayCool.aMember=i;
49   }
50
51   __declspec(noinline)
52   void f( )
53   {
54       printf("f \n");
55       e(7);
56   }
57
58   __declspec(noinline)
59   void g( )
60   {
61       printf("g \n");
62       for (int i=3; i<7; i++)
63       {
64           wayCool.anArray[i]=(char)(i*glo1);
65       }
66   }
67
68   __declspec(noinline)
69   void h( )
70   {
71       printf("h \n");
72       printf ("glo1 %d, glo2 %d \n", glo1, glo2);
73       for (int i=glo1; i<glo2; i++)
```

APPENDIX A-continued

This is an example source code globalcouplingsample.cpp.

```
74       {
75           inAnArrayToo[i].aMember=123;
76       }
77   }
78
79   __declspec(noinline)
80   void i( )
81   {
82       printf("i \n")
83       printf("glo1 %d, glo2 %d \n", glo1, glo2);
84       for (int i=glo1; i<glo2; i++)
85       {
86           inAnArrayToo[i].anArray[2]='y';
87       }
88   }
89
90   int __cdecl main( )
91   {
92       b( );
93       d( );
94       f( );
95       g( );
96       h( );
97       i( );
98   }
```

What is claimed is:

1. A method comprising:
   identifying procedure symbols and global variables in compiled code and an associated symbol table;
   performing for each of one or more procedures of the compiled code:
      performing for each instruction of a respective procedure of the one or more procedures of the compiled code;
         reading a respective instruction of the respective procedure,
         checking memory addressing with respect to the respective instruction to determine whether an address of a variable is taken, the variable is read, or the variable is written,
         determining whether the variable is a global variable,
         classifying the global variable as being read, written, or taken, when the variable is determined to be the global variable, based on a result of the checking memory addressing, and
         updating a global-variable-to-procedure mapping and a procedure-to-global-variable mapping based on the classifying; and
   the method further comprising:
      extracting coupling metrics based, at least in part, on the global-variable-to-procedure mapping and the procedure-to-global-variable mapping, wherein
   the method is implemented on one or more computing devices.

2. The method of claim 1, wherein the compiled code is binary machine code.

3. The method of claim 1, wherein the compiled code is machine-independent intermediate code that is convertible into binary machine code by a just-in-time compiler.

4. The method of claim 1, wherein the compiled code is compiled from source code written in an object-oriented programming language.

5. The method of claim 1, wherein the compiled code is compiled from source code written in a non object-oriented programming language.

6. The method of claim 1, wherein the compiled code is compiled from source code written in an object-oriented programming language and from source code written in a non object-oriented programming language.

7. The method of claim 1, wherein the extracting coupling metrics further comprises:
performing for each symbol of the compiled code and the symbol table:
determining whether a respective symbol represents a first class of one or more classes;
performing, when the respective symbol is determined to represent the first class:
adding a first node representing the first class to a class dependency graph when the first node is not already in the class dependency graph,
determining whether the first class inherits from a second class of the one or more classes,
adding, when the first class is determined to inherit from the second class, a second node representing the second class to the class dependency graph when the second node is not already in the class dependency graph,
computing a base class coupling metric for the first class,
determining whether a member variable of the first class is a third class of the one or more classes,
adding, when the member variable is determined to be the third class, a third node representing the third class to the class dependency graph when the third node is not already in the class dependency graph,
computing a member variable coupling metric for the first class,
determining whether a member function of the first class has a parameter representing a fourth class of the one or more classes,
adding, when the member function of the first class has the parameter representing the fourth class, a fourth node representing the parameter of the member function to the class dependency graph when the fourth node is not already in the class dependency graph,
computing a member function parameter coupling metric for the first class
determining whether the member function has a local variable that represents a fifth class of the one or more classes,
adding, when the member function has the local variable that represents the fifth class, a fifth node representing the local variable to the class dependency graph when the fifth node is not already in the class dependency graph, and
computing a member function local variable coupling metric for the first class; and
the method further comprising computing a total cyclic class coupling metric based on the class dependency graph.

8. One or more computer storage media having computer-executable components comprising:
a reader to access compiled code, symbols from the compiled code and symbol table information of the compiled code; and
a coupling metrics extraction component to calculate coupling metrics from the compiled code and the symbol table information, the coupling metrics extraction component being configured to:
determine whether a respective symbol represents a first class of one or more classes;
perform, when the respective symbol is determined to represent the first class;
add a first node representing the first class to a class dependency graph when the first node is not already in the class dependency graph,
determine whether the first class inherits from a second class of the one or more classes,
update the class dependency graph to reflect the first class depending on the second class, when the first class is determined to inherit from the second class,
determine whether a member variable of the first class represents a third class of the one or more classes,
update the class dependency graph to reflect the first class depending on the third class, when the member variable of the first class is determined to represent the third class,
determine whether a member function of the first class has a parameter representing a fourth class of the one or more classes,
update the class dependency graph to reflect the first class depending on the parameter of the member function, when the member function of the first class is determined to have the parameter representing the fourth class,
determine whether the member function has a local variable that represents a fifth class of the one or more classes, and
update the class dependency graph to reflect the first class depending on the local variable of the member function, when the local variable of the member function is determined to represent the fifth class; and
compute a total cyclic class coupling metric based on the class dependency graph.

9. The computer storage media of claim 8, wherein the reader provides a level of abstraction so that the coupling metrics extraction component is machine-independent.

10. The one or more computer storage media of claim 8, wherein the reader is able to:
enumerate global variables from the symbol table information;
enumerate procedures from the symbol table information;
read instructions of the procedures;
identify local variables of the procedures; and
identify parameters of the procedures.

11. The one or more computer storage media of claim 10, wherein the coupling metrics to be calculated by the coupling metrics extraction component include one or more of: a first metric that measures how many of the global variables are read by one or more of the procedures, a second metric that measures how many of the global variables are written to by one or more of the procedures, a third metric that measures how many of the global variables have their address taken by one or more of the procedures, and a fourth metric that measures how the procedures are coupled to one another.

12. The one or more computer storage media of claim 10, wherein the reader is further able to:
identify whether a symbol is any of the one or more classes,
identify member variables of any of the one or more classes,
identify member functions of any of the one or more classes,
identify parameters of the member functions of any of the one or more classes,
identify local variables of the member functions of any of the one or more classes, identify return values of the member functions of any of the one or more classes, and base classes of any of the one or more classes.

13. The one or more computer storage media of claim 8, wherein the coupling metrics able to be calculated by the coupling metrics extraction component include one or more of: a first metric that measures class coupling through inheritance, a second metric that measures class coupling through member variables, a third metric that measures class coupling through parameters of member functions, a fourth metric that measures class coupling through local variables of member functions, and a fifth metric that measures class coupling through return values of member functions.

14. An integrated development environment system that is able to be integrated with a source code version control component, the system comprising:

an authoring tool to edit source code;

a compiler to compile the source code into compiled code and to generate symbol table information for the compiled code;

a debugger to enable analysis of the compiled code being executed; and a coupling metrics system to extract coupling metrics from the compiled code and the symbol table information, the coupling metrics system being configured to:

determine a first set of procedures of one or more procedures of the compiled code that read one or more global variables, determine a second set of procedures from the one or more procedures of the compiled code that write to or take an address of one or more of the global variables, perform for each combination of a respective second procedure from the second set of procedures and a respective first procedure from the first set of procedures, such that the respective second procedure is different from the respective first procedure:

determine whether the respective second procedure writes to, takes an address of, or reads a same global variable that the respective first procedure writes to or takes the address of, and set a respective flag to indicate coupling between the respective first procedure and the respective second procedure when the respective second procedure is determined to write to, take an address of, or read the same global variable that the respective first procedure writes to or takes the address of and compute a coupling metric for each of the one or more procedures based on the respective flags, wherein the integrated development environment system is implemented on one or more computing devices.

15. The integrated development environment system of claim 14, wherein the compiler is able to compile into the compiled code one or more libraries having contents referred to by the source code.

16. The integrated development environment system of claim 14, wherein the compiler is able to compile source code written in an object-oriented programming language.

17. The integrated development environment system of claim 14, wherein the compiler is able to compile source code written in a non object-oriented programming language.

18. The integrated development environment system of claim 14, wherein the coupling metrics system further comprises a reader, the reader being capable of:

enumerating the global variables from the symbol table information, enumerating the procedures from the symbol table information, and reading instructions of the procedures.

* * * * *

UNITED STATES PATENT AND TRADEMARK OFFICE
CERTIFICATE OF CORRECTION

PATENT NO. : 7,725,881 B2  
APPLICATION NO. : 11/449905  
DATED : May 25, 2010  
INVENTOR(S) : Thirumalesh K. Bhat et al.

It is certified that error appears in the above-identified patent and that said Letters Patent is hereby corrected as shown below:

In column 19, line 43, in Claim 7, delete "class" and insert -- class, --, therefor.

In column 20, line 2, in Claim 8, delete "class;" and insert -- class: -- therefor.

In column 21, line 3, in Claim 12, before "base classes" insert -- identify --.

In column 21, line 5, in Claim 13, after "metrics" delete "able".

In column 22, line 10, in Claim 14, delete "of" and insert -- of; --, therefor.

Signed and Sealed this  
Seventeenth Day of May, 2011

David J. Kappos  
*Director of the United States Patent and Trademark Office*